United States Patent
Lin et al.

(10) Patent No.: US 7,242,965 B2
(45) Date of Patent: Jul. 10, 2007

(54) WIRELESS COMMUNICATION SYSTEM AND METHOD FOR HIGH-SPEED TRANSPORT VEHICLE

(75) Inventors: Chang-Yu Lin, Taipei (TW); Yu-Lun Chiang, Tao-Yuan Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 32 days.

(21) Appl. No.: 11/161,071

(22) Filed: Jul. 21, 2005

(65) Prior Publication Data

US 2006/0019600 A1 Jan. 26, 2006

(30) Foreign Application Priority Data

Jul. 23, 2004 (TW) ................................ 93122118 A

(51) Int. Cl.
*H04Q 7/20* (2006.01)
*H04B 1/00* (2006.01)
*H04H 1/00* (2006.01)

(52) U.S. Cl. ...................... 455/561; 455/450; 455/560; 455/447; 455/451; 455/422.1; 455/436; 455/455; 455/3.02; 455/509

(58) Field of Classification Search .................. 455/10, 455/11.1, 12.1, 13.1, 41.2–41.3, 15–16, 56–561, 455/3.02; 370/310.2, 312–316, 328–333, 370/350, 363, 335–338; 342/57–58; 340/988–994, 340/539.1, 539.2
See application file for complete search history.

(56) References Cited

U.S. PATENT DOCUMENTS

| | | | | |
|---|---|---|---|---|
| 5,722,072 A * | 2/1998 | Crichton et al. | ............. | 455/437 |
| 5,940,380 A * | 8/1999 | Poon et al. | ................. | 370/330 |
| 5,966,657 A * | 10/1999 | Sporre | ......................... | 455/425 |
| 6,002,940 A * | 12/1999 | Richter | ....................... | 455/502 |
| 6,212,382 B1 * | 4/2001 | Watson et al. | .............. | 455/444 |
| 6,311,059 B1 * | 10/2001 | Walton | ........................ | 455/425 |
| 6,718,158 B1 * | 4/2004 | Suonvieri | ...................... | 455/9 |
| 6,795,706 B1 * | 9/2004 | Cheng | ........................ | 455/436 |
| 7,024,193 B2 * | 4/2006 | Tuutijarvi | .................... | 455/434 |
| 2003/0235165 A1 * | 12/2003 | Wang | ........................ | 370/331 |
| 2005/0153722 A1 * | 7/2005 | Chou et al. | ................. | 455/512 |

FOREIGN PATENT DOCUMENTS

AU 9959581 A * 6/2000

* cited by examiner

*Primary Examiner*—Meless Zewdu
(74) *Attorney, Agent, or Firm*—Winston Hsu

(57) ABSTRACT

A wireless communication system includes a fixed base transceiver station that includes a fixed base station number and a fixed broadcast control channel (BCCH) allocation list and broadcasts a fixed BCCH covering a first range; and a first base transceiver station that includes a first number and a first BCCH allocation list. When the first base transceiver station moves into the first range, the first number is stored into the fixed BCCH allocation list and the fixed base station number is stored into the first BCCH allocation list.

24 Claims, 3 Drawing Sheets

WIRELESS COMMUNICATION SYSTEM AND METHOD FOR HIGH-SPEED TRANSPORT VEHICLE

BACKGROUND OF THE INVENTION

1. Field of the Invention

The invention relates to a wireless communication system and method thereof, more particularly to a wireless communication for high-speed transport and method thereof.

2. Description of the Prior Art

In the $21^{st}$ century, high-speed vehicles have played an important role in transportation. For example, the Taiwan high-speed rail system which will be operating in the near future has estimated speeds for trains at a maximum of 300 km/h. Other than using satellite communication, current wireless communication systems, such as the global system for mobile communication (GSM) and the code division multiple access (CDMA) system, are not able to support a mobile unit in such a fast moving environment to maintain a stable connection. Devices affected are, for example, mobile phones or wireless communication modules.

For the mobile unit in the fast moving environment and in a current wireless communication system, a fading effect or a Doppler effect affects connectivity. For example in the GSM 900 system, even though it covers a broad region, it is still unable to support a mobile unit moving at more than 250 km/h to maintain a stable connection quality. Therefore, these wireless communication systems are not able to support mobile units on a high-speed train. If the high-speed train can provide a satellite phone for every passenger to communicate with the outside network, then installing satellite phones can greatly increase profitability for the high-speed train operators. Therefore how to improve current wireless communication to meet requirements of future high-speed trains is an important issue.

SUMMARY OF THE INVENTION

The claimed invention relates to a wireless communication system for high-speed transport and method thereof to solve the above-mentioned problem.

The invention involves a fixed base transceiver station (BTS) and a mobile base transceiver station (BTS). The fixed BTS has a fixed base station number and a fixed broadcast control channel (BCCH) allocation list for broadcasting a fixed BCCH covering a predetermined range, and the mobile BTS has a mobile base station number and a mobile BCCH allocation list for broadcasting a mobile BCCH. When the mobile BTS moves into the predetermined range, the mobile base station number is stored into the fixed BCCH allocation list and the fixed base station number is stored into the mobile BCCH allocation list. This allows mobile units to handoff between the mobile BTS and the fixed BTS when the mobile BTS is in the predetermined range of the fixed BTS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
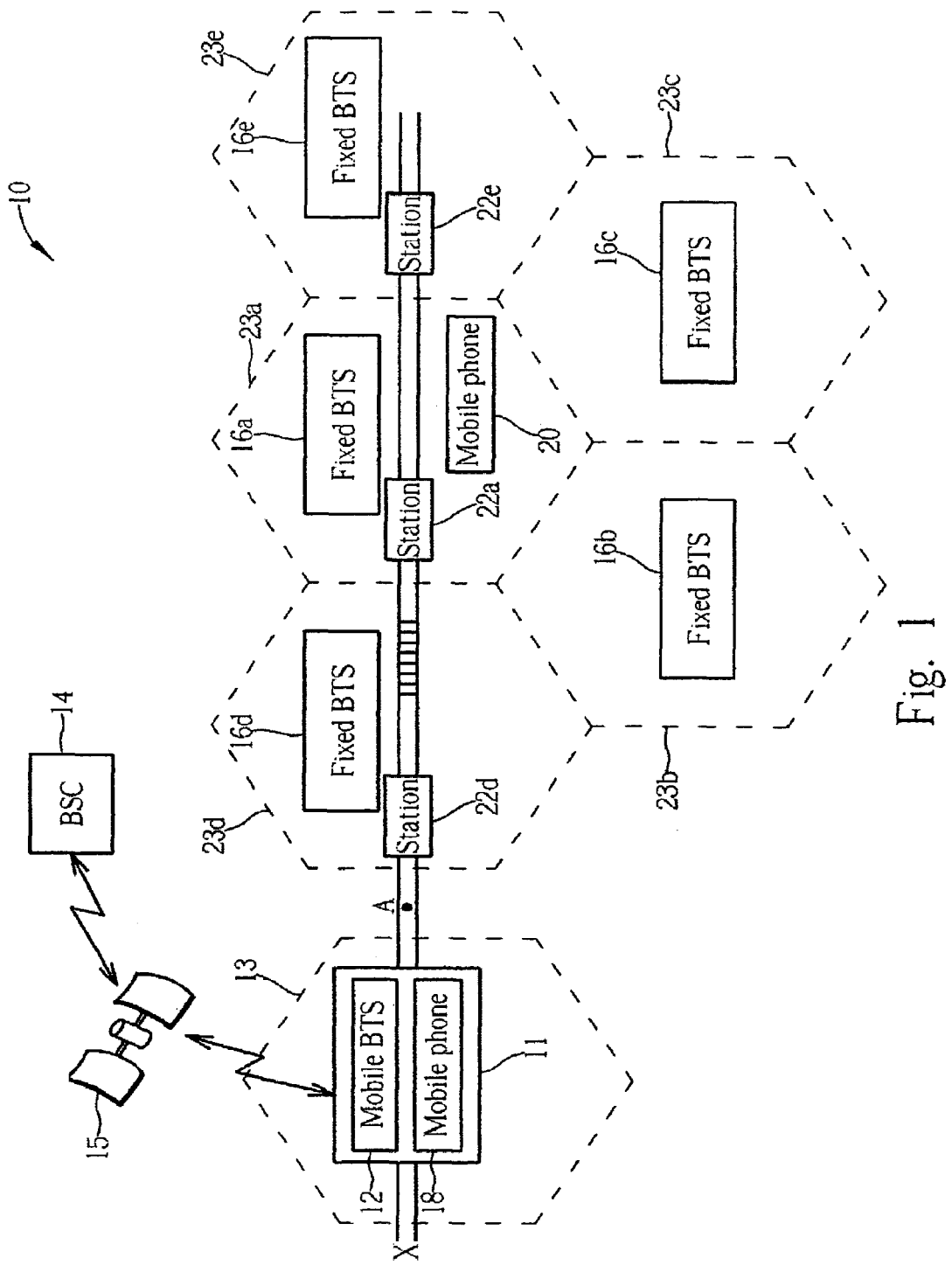
FIG. 1 is a diagram of a wireless communication system according to the present invention.

Please refer to FIG. 1. FIG. 1 is a diagram of a wireless communication system 10 according to the present invention. The wireless communication system 10 comprises a mobile base transceiver station (BTS) 12, a base station controller (BSC) 14, and a fixed BTS. FIG. 1 shows five fixed BTSs 16a, 16b, 16c, 16d and 16e. The fixed BTSs 16a, 16b, 16c, 16d, and 16e are capable of exchanging data through a wired method or a wireless method with the BSC 14. The mobile BTS 12 is disposed on a vehicle, for example on a high-speed train 11, and signal coverage of the mobile BTS 12 corresponds to cell 13 of FIG. 1. The high-speed train 11 departs and travels on a single route that is route X of FIG. 1.

Figure 2:
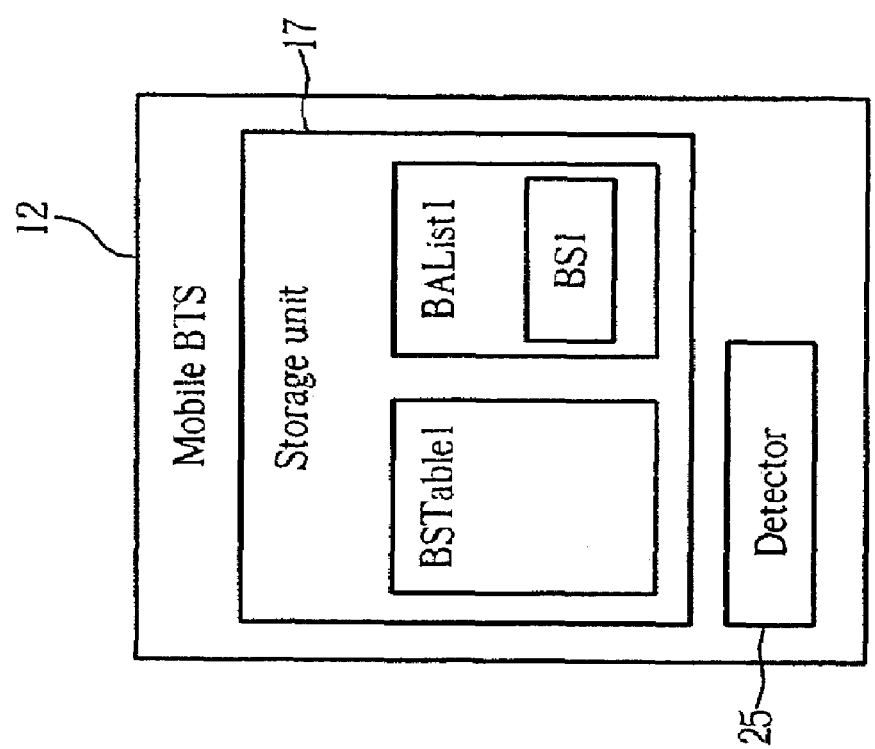
FIG. 2 illustrates a functional block diagram of a mobile BTS according to FIG. 1.

Please refer to FIG. 2. FIG. 2 illustrates a functional block diagram of a mobile BTS 12 according to FIG. 1. The mobile BTS 12 broadcasts a broadcast control channel (BCCH) 1, and the mobile BTS 12 comprises a first storage unit 17 and a detector 25. The first storage unit 17 is used for storing a fixed base station number BSTable1 and a first BCCH allocation list BAList1, the fixed station number BSTable1 records all the fixed BTSs on the route X (fixed BTS 16a, 16d and 16e as shown in FIG. 1, but not fixed BTSs 16b and 16c). Each BTS corresponds to a fixed station number BS2; the fixed station number BS2 corresponds to the fixed BCCHs that are used by the fixed BTSs. As known by those skilled in the art, there is a first number BS1 recorded in the first BCCH allocation list BAList1 that corresponds to the BCCH1 that is used by the mobile BTS 12. In the high-speed train 11, a mobile unit, for example a mobile phone 18, is located in the cell 13 (which is in the coverage of the mobile BTS 12). The mobile phone 18 can communicate with the mobile BTS 12 through a global system for mobile communication (GSM) or a code division multiple access (CDMA) system to perform data exchange. In the present invention, the BSC 14 and the mobile BTS 12 exchange data through satellite communication, and the mobile BTS 12 can transmit output signals from the mobile phone 18 to the BSC 14 through a satellite 15. The detector 25 detects the signal strength of the fixed BTSs (for example the fixed BTS 16a, 16d and 16e), and a more detailed explanation will be mentioned. The detector 25 is not an essential apparatus in other embodiments. The mobile phone 18 used in the wireless communication system 10 of the present invention is capable of connecting to other outside networks by applying other methods.

In general, the high-speed train 11 travels on the route X and will stop at stations 22d, 22a and 22e. As shown in FIG. 1, the fixed BTSs 16a, 16b and 16c are installed adjacent to the station 22a, which also corresponds to the fixed cells 23a, 23b, and 23c respectively. Without considering the influences from the type of landscape, weather, or other factors, the station 22a is located within the signal coverage of the fixed BTS 16a (fixed cell 23a), and all wireless communication surrounding the station 22 will be controlled by the fixed BTS 16a.

Figure 3:
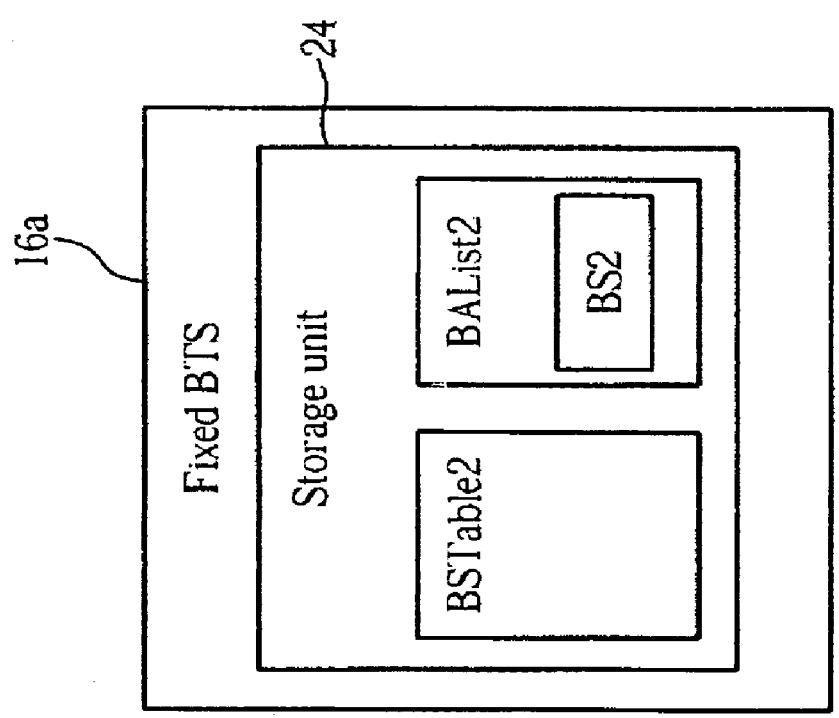
FIG. 3 illustrates a functional block diagram of a fixed BTS according to FIG. 1.

The fixed BTSs 16a, 16b, 16d and 16e have the same structure and function. Please refer to FIG. 3. FIG. 3 illustrates a functional block diagram of the fixed BTS 16a according to FIG. 1. The fixed BTS 16a will broadcast a BCCH 2. The fixed BTS 16a comprises a second storage unit 24 for recording a mobile base station number BSTable2 and a fixed BCCH allocation list BAList2. The mobile base station number BSTable2 records the first number BS1 of the mobile BTS 12 that stops at the fixed BTS 16a; the first number BS1 corresponds to the broadcast control channel used by the mobile BTS 12. Those skilled in the art will know that the fixed allocation list BAList2 records a fixed base station number BS2 which corresponds to the fixed BCCH2 used by the fixed BTS 16a and other BCCHs used by neighboring base transceiver stations such as the fixed BTSs 16b and 16c. When the high-speed train 11 enters the station 22a corresponding to the fixed cell 23a, the mobile BTS 12 reads the fixed base station number BS2 of the fixed BTS 16a within the coverage of the station 22a, which corresponds to the fixed station base number BSTable1, to be stored into the first BCCH allocation list BAList1. When moving closer to the station 22a (when the mobile BTS 12 moves into the fixed cell 23a), the mobile BTS 12 compares the fixed base station number BS2 so as to identity the fixed BCCH2 is used by the fixed BTS 16a. At this time, the mobile phone 18, located in the cell 13, will receive information from the fixed BCCH2, therefore when control of the wireless communication of a mobile phone 20 is transferred from the mobile BTS 12 to the fixed BTS 16a, the mobile phone 20 is capable of establishing a connection with the fixed BTS 16a with assistance from the fixed BCCH2. Furthermore, the fixed BCCH allocation list BAList2 of the fixed BTS 16a will record the first number BS1 of the mobile BTS 12. Therefore when the mobile BTS 12 is moving closer to the fixed cell 23a, the fixed BTS 16a can identity the fixed BCCH1 used by the mobile BTS 12. The mobile phone 20, located in the cell 23a (within the coverage of the fixed BTS 16a), receives information from the channel BCCH1 therefore when control of the wireless communication of the mobile phone 20 is transferred from the fixed BTS 16a to the mobile BTS 12, the mobile phone 20 is capable of establishing a connection with the mobile BTS 12 with assistance from the channel BCCH1.

As the neighboring fixed BTSs 16b and 16c do not record any information of the mobile BTS 12, the BTSs 16b and 16c are unable to acknowledge the existence of the mobile BTS 12. Therefore, when the high-speed train 11 (with the mobile BTS 12 installed) arrives at the station 22a, the mobile phone 18 on the train will not receive any information from the fixed BTSs 16b and 16c. Hence the mobile phone 18 will not connect to other fixed BTSs.

When the mobile phone 18 follows the high-speed train 11 along the route X at high speed, the mobile phone 18 connects to the outside network through the mobile BTS 12. The mobile BTS 12 then exchanges data with the BSC 14 through satellite communication. Therefore, the mobile phone 18 traveling at high speed in the high-speed train 11 is still able to connect to the outside network and maintain a stable signal quality. When the mobile phone 18 moves in or out of the high-speed train 11 (for example when a user carries the mobile phone 18 into the high-speed train from the station 22a or leaves the high-speed train and enters the station 22a), the wireless communication system 10 is required to control the first BCCH allocation list BAList1 and the fixed BCCH BAList2 in order to maintain a stable connection for the mobile phone 18. Two types of scenarios are discussed as follows:

(1) The mobile phone 18 is located in the high-speed train 11 traveling at high speed. When the high-speed train 11 arrives at the train station 22a, the mobile phone 18 leaves the high-speed train 11 and enters into the station 22a.

When the mobile phone 18 is on the moving high-speed train 11, it is located within the coverage of BTS 12 (cell 13). Thus, the mobile phone 18 is not affected by the fixed BTS.

Please refer to FIG. 1. When the high-speed train 11 is moving to the station 22a and entering the coverage of the fixed BTS 16a, the mobile BTS 12 installed in the high-speed train 11 reads the base station number BS2 stored in the first BCCH allocation list BAList1 of the first storage unit 17. The base station number BS2 corresponds to the fixed BCCH2 used by the fixed BTS 16a corresponding to the station 22a. Therefore the mobile phone 18 located within the cell 13 receives information from the fixed BCCH2.

When the high-speed train moves closer to the train station 22a, the mobile unit 18 is located within the cell 13 and the fixed cell 23a as well, so that the mobile unit 18 receives both signals from the BCCH1 broadcast by first BTS 12 and the fixed BCCH2 broadcast by the fixed BTS 16a. As the mobile unit 18 has received signals from the BCCH2, the mobile phone 18 can maintain the connection transferred from the mobile BTS 12 to the fixed BTS 16a. Please note this mechanism is known as handover or cell reselection.

As the high-speed train 11 travels along the route X it passes a plurality of stations. According to the present invention, the fixed base station numbers of the fixed BTSs which cover the plurality of train stations, are stored in the fixed station base number BSTable1 sequentially. Moreover, the previously used fixed BTS is recorded so that the mobile BTS 12 can determine the next fixed BTS. Please refer to FIG. 1 and FIG. 2. The records of the fixed BTSs are listed sequentially in the fixed station base number BSTable1 as the fixed station number of BTSs 16d, 16a, 16e, etc. If the previous fixed BTS used is the fixed BTS 16d, then the next fixed BTS will be the fixed BTS 16a, hence the next broadcast control channel can be identified. The following description describes some embodiments of how the first BTS 12 determines the nearest train station and the related corresponding fixed BTS. The methods are explained below:

Method 1:

The first storage unit 17 records the moving distance of BTS 12 on the route X (in distance units) and a predetermined distance unit D2. Also, the location of each fixed base station corresponding to each train station on the route is recorded in distance units. Predetermined distance unit D2 is a threshold distance to show that the distance between mobile BTS 12 and the fixed base station is close enough, which means the mobile BTS 12 is going to arrive at the train station. Hence according to location of each fixed BTS on the route X, the mobile BTS 12 can determine the next fixed BTS. For example, if the fixed BTS 16a is located at distance D on the route X, when recording that the mobile BTS 12 is located at distance D1 of the route X, then $D-D1 \leq D2$ (D2=predetermined value) means that the mobile BTS 12 is arriving into the fixed cell 23a. Please note that this method does not utilize the detector 25 installed in the mobile BTS 12.

Method 2: The mobile BTS 12 comprises the detector 25 for detecting signal strength of the fixed BTS 16a to determine whether the mobile BTS 12 has moved into the fixed cell 23a. When the detector 25 detects signals from the fixed BTS 16a, and the signal strength reaches to a predetermined value, it is determined that the mobile BTS 12 has entered the fixed cell 23a.

In the above-mentioned methods, when the mobile BTS 12 is detected moving into the fixed cell 23a, it means that BTS 12 is arriving at the station 22a. As the station 22a corresponds with the fixed BTS 16a, the broadcast control channel used is the fixed BCCH2 and can be identified immediately. Therefore the mobile BTS 12 reads out the fixed base station number BS2 of the fixed cell 23a in the fixed base station number BSTable1, stores BS2 into the first BCCH allocation list BAList1, and deletes the previous fixed base station number (which corresponds to the fixed BTS 16d).

(2) The mobile phone 18 is currently within the station 22a. When the high-speed train 11 arrives at the station 22a, the mobile phone 18 leaves the station 22a and enters the high-speed train 11.

When the mobile phone 18 is located within the train station 22a which is also located within the coverage of the fixed BTS 16a (fixed cell 23a), and the high-speed train 11 approaches the station 22a, the fixed BTS16a reads the first base station number BS1 recorded in the BCCH allocation list BAList2 of the second storage unit 24. The mobile unit 18 located within the fixed cell 23a receives signals from the BCCH1 used by the mobile BTS 12. At this time, as the mobile unit 18 is located within the fixed cell 23a, the mobile unit 18 receives signals of the BCCH1 broadcast by the mobile BTS 12 and BCCH2 broadcast by the fixed BTS 16a.

When the high-speed train 11 arrives at the station 22a, the mobile phone 18 enters the high-speed train 11 from the station 22a. The BCCH1 used by the mobile BTS 12 has been identified, so the mobile phone 18 can immediately maintain communication service by switching from the fixed BTS 16a to the mobile BTS 12. As mentioned in the above, the switching mechanism is known as handover or cell reselection. When the mobile BTS 12 leaves the fixed cell 23a, the fixed BTS 16a deletes the number BS1 in the BCCH allocation list BAList2 and the mobile BTS 12 deletes the base station number BS2 in the first BCCH allocation list BAList1.

Furthermore, the high-speed train 11 may have an emergency stop, that is, the high-speed train 11 may decelerate to a position A not located within the coverage of any fixed BTS recorded in the base station number BSTable1 of the mobile BTS 12. At this time, if the mobile phone 18 is still located within the cell 13, the mobile phone 18 can continue to accept communication service from the mobile BTS 12. if the mobile phone 18 leaves the cell 13, then there may be a temporary loss of signal which requires cell reselection to switch to the nearest fixed BTS to perform a reconnection.

In conclusion, when the high-speed train moves at high speed, the wireless communication system utilizes satellite communication to allow the mobile BTS and the BSC to exchange data normally. Hence the mobile phone on the high-speed train is able to communicate with an outside receiving end. When the high-speed train arrives at a station, if a mobile phone enters the high-speed train from the station or another mobile phone leaves the high-speed train and enters the station, the wireless communication system manages the BCCH allocation lists of the mobile BTS and the fixed BTS appropriately to allow the mobile phones to function normally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication system comprising:
   a fixed base transceiver station (BTS) comprising a fixed base station number and a fixed broadcast control channel (BCCH) allocation list for broadcasting a fixed BCCH covering a predetermined range; and
   a mobile base transceiver station (BTS) comprising a mobile base station number and a mobile BCCH allocation list for broadcasting a mobile BCCH;
   wherein when the mobile BTS moves into the predetermined range, the mobile base station number is stored into the fixed BCCH allocation list and the fixed base station number is stored into the mobile BCCH allocation list.

2. The wireless communication system in claim 1 further comprising a base station controller (BSC) coupled to the fixed BTS via a wired communication system, and coupled to the mobile BTS via a satellite communication system.

3. The wireless communication system in claim 1 further comprising a plurality of fixed BTSs corresponding to a plurality of predetermined ranges, the mobile BTS moving along a predetermined route and the plurality of predetermined ranges covering part of the predetermined route.

4. The wireless communication system in claim 3 further comprising a mobile unit, wherein the mobile BTS is disposed on a vehicle, and when the vehicle is moving on the predetermined route and the mobile unit is in the vehicle, the mobile unit communicates with the mobile BTS.

5. The wireless communication system in claim 4 wherein when the vehicle stops within the predetermined range of one of the fixed BTSs, the mobile unit receives signals of the mobile BCCH broadcast by the mobile BTS and signals of the fixed BCCH broadcast by the fixed BTS simultaneously.

6. The wireless communication system in claim 3 wherein the plurality of fixed BTSs are located sequentially along the predetermined route, the mobile BTS contains the fixed base station numbers in the mobile BCCH allocation list and reads out the fixed base station numbers sequentially.

7. The wireless communication system in claim 3 wherein the mobile BTS contains fixed base station numbers of the fixed BTSs, and when the mobile BTS moves to a predetermined range corresponding to an appointed fixed BTS, the mobile BTS reads out the fixed base station number corresponding to the appointed fixed BTS and stores the corresponding fixed base station number into the mobile BCCH allocation list.

8. The wireless communication system in claim 7 wherein the mobile BTS records its moving distance for determining whether the mobile BTS moves into the predetermined range; if the mobile BTS moves into the predetermined range, the mobile BTS reads out the fixed base station number corresponding to the predetermined range and stores the fixed base station number into the mobile BCCH allocation list and deletes previous fixed base station number.

9. The wireless communication system in claim 7 wherein the mobile BTS comprises a detector for detecting signal strength of the fixed BTS for determining whether the mobile BTS moves into the predetermined range; if the mobile BTS moves into the predetermined range, the mobile BTS reads out the fixed base station number corresponding to the predetermined range and stores the fixed base station number into the mobile BCCH allocation list and deletes previous fixed base station number.

10. The wireless communication system in claim 1 wherein when the mobile BTS is out of the predetermined range, the fixed BTS deletes the mobile base station number in the fixed BCCH allocation list and the mobile BTS deletes the fixed base station number in the mobile BCCH allocation list.

11. A method of wireless communication for a wireless communication system, the wireless communication system comprising a fixed base transceiver station (BTS), the fixed BTS comprising a fixed base station number and a fixed broadcast control channel (BCCH) allocation list for broadcasting a fixed BCCH covering a predetermined range, the method comprising:
  providing a mobile BTS comprising a mobile base station number;
  moving the mobile BTS into the predetermined range; and
  storing the mobile base station number into the fixed BCCH allocation list.

12. The method of claim 11 wherein the mobile BTS comprises a mobile BCCH allocation list for broadcasting a mobile BCCH, the method further comprising:
  storing the fixed base station number into the mobile BCCH allocation list.

13. The method of claim 11 wherein the wireless communication system further comprises a base station controller (BSC), the method further comprising:
  coupling the mobile BTS to the BSC through satellite communication; and
  coupling the fixed BTS to the BSC through wired communication.

14. The method of claim 11 wherein the wireless communication system further comprises a mobile unit located in a vehicle, the method further comprising:
  disposing the mobile BTS on the vehicle;
  moving the vehicle on a predetermined route; and
  establishing communication between the mobile unit and the mobile BTS.

15. The method of claim 14 wherein the wireless communication system further comprises a plurality of fixed BTSs located sequentially on the predetermined route, the method further comprising:
  the mobile BTS recording a plurality of fixed base station numbers of the fixed BTSs; and
  the mobile BTS reading the plurality of the fixed base station numbers sequentially and storing the plurality of the fixed base station numbers into the mobile BCCH allocation list.

16. The method of claim 15 further comprising:
  the mobile BTS recording its moving distance;
  determining whether the mobile BTS has moved into the predetermined range according to the moving distance; and
  if the mobile BTS moves into the predetermined range, reading and storing the fixed base station numbers corresponding to the predetermined range into the mobile BCCH allocation list and deleting previous fixed base station numbers.

17. The method of claim 15 further comprising:
  the mobile BTS detecting a signal strength of the fixed BTS;
  determining whether the mobile BTS moves into the predetermined range according to the signal strength; and
  if the mobile BTS moves into the predetermined range, reading and storing the fixed base station numbers corresponding to the predetermined range into the mobile BCCH allocation list and deleting previous fixed base station numbers.

18. A mobile base transceiver station (BTS) for a wireless communication system, the mobile BTS comprising:
  a mobile broadcast control channel (BCCH) allocation list for broadcasting a mobile BCCH;
  wherein the wireless communication system comprises a fixed BTS comprising a predetermined range, the mobile BTS is movable in and out of the predetermined range, and when the mobile BTS is located in the predetermined range, a fixed base station number of the fixed BTS is stored into the mobile BCCH allocation list.

19. The mobile BTS of claim 18 further comprising a mobile base station number, wherein when the mobile BTS is located in the predetermined range, the mobile base station number of the mobile BTS is stored into the fixed BCCH allocation list.

20. The mobile BTS of claim 18 wherein the wireless communication system further comprises a base station controller (BSC) coupled to the mobile BTS in a wireless manner, and coupled to the fixed BTS in a wired manner.

21. The mobile BTS of claim 18 wherein the mobile BTS is moveable on a predetermined route, the wireless communication system further comprising a plurality of fixed BTSs corresponding to a plurality of predetermined ranges covering part of the predetermined route.

22. The mobile BTS of claim 21 wherein the mobile BTS contains fixed base station numbers of the plurality of fixed BTSs, and when the mobile BTS moves into a predetermined range corresponding to an appointed fixed BTS, the mobile BTS reads out the corresponding fixed base station number of the appointed fixed BTS and stores the corresponding fixed base station number into the mobile BCCH allocation list.

23. The mobile BTS of claim 22 wherein a moving distance of the mobile BTS is recorded for determining whether the mobile BTS moves into the predetermined range; if the mobile BTS moves into the predetermined range, the mobile BTS reads out the fixed base station number corresponding to the predetermined range and stores the fixed base station number into the mobile BCCH allocation list and deletes previous fixed base station number.

24. The mobile BTS of claim 22 further comprising a detector for detecting signal strength of the fixed BTS for determining whether the mobile BTS moves into the predetermined range; if the mobile BTS moves into the predetermined range, the mobile BTS reads out the fixed base station number corresponding to the predetermined range and stores the fixed base station number into the mobile BCCH allocation list and deletes previous fixed base station number.

* * * * *